United States Patent
Meirosu et al.

(10) Patent No.: US 8,560,777 B2
(45) Date of Patent: Oct. 15, 2013

(54) METHOD, SERVER, COMPUTER PROGRAM AND COMPUTER PROGRAM PRODUCT FOR CACHING

(75) Inventors: Catalin Meirosu, Stockholm (SE); Andras Valkó, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/515,194

(22) PCT Filed: Dec. 16, 2009

(86) PCT No.: PCT/SE2009/051431
§ 371 (c)(1),
(2), (4) Date: Jun. 11, 2012

(87) PCT Pub. No.: WO2011/075019
PCT Pub. Date: Jun. 23, 2011

(65) Prior Publication Data
US 2012/0290790 A1 Nov. 15, 2012

(51) Int. Cl.
*G06F 12/00* (2006.01)
(52) U.S. Cl.
USPC .......................... 711/133; 711/118
(58) Field of Classification Search
USPC ................................ 711/133, 118
See application file for complete search history.

(56) References Cited

U.S. PATENT DOCUMENTS

2007/0100796 A1* 5/2007 Wang .................................. 707/3
2009/0157512 A1* 6/2009 King ................................ 705/14
2011/0314145 A1* 12/2011 Raleigh et al. ................ 709/224

FOREIGN PATENT DOCUMENTS

WO   03/001327 A2   1/2003
WO   2009/068952 A2   6/2009

OTHER PUBLICATIONS

International Search Report for PCT/SE2009/051431, mailed Sep. 6, 2010.

* cited by examiner

*Primary Examiner* — Hashem Farrokh
(74) *Attorney, Agent, or Firm* — Withrow & Terranova,PLLC

(57) ABSTRACT

It presented a method comprising the steps of: determining, in a caching server of a telecommunication network, a user profile to analyze; obtaining, in the caching server, a group of user profiles; obtaining correlation measurements for each user profile in the group of user profiles in relation to the user profile to analyze; and calculating a content caching priority for at least one piece of content of a content history associated with the group of user profiles, taking the correlation measurement into account. A corresponding server, computer program and computer program product are also provided.

19 Claims, 7 Drawing Sheets

| 30 Content id | 31 Size | 32 Content caching priority |
|---|---|---|
| x | 3 | 100 |
| y | 5 | 50 |
| z | 10 | 40 |
| . . . | . . . | . . . |

METHOD, SERVER, COMPUTER PROGRAM AND COMPUTER PROGRAM PRODUCT FOR CACHING

This application is a 35 USC 371 national phase filing of International Application No. PCT/SE2009/051431, filed Dec. 16, 2009, the disclosure of which is incorporated herein by reference in its entirety.

TECHNICAL FIELD

The invention relates generally to caching and more particularly to improving caching accuracy.

BACKGROUND

Caching media is a well-known technique for improving access times and optimizing bandwidth usage in telecommunication or enterprise networks. A cache uses a block of memory, such as disk space or other storage device, to temporarily store a copy of some data that is likely to be needed in the future.

When cache clients (i.e., entities that need data, such as computers or mobile terminals) try to access some data, they check the cache first. If the necessary data is available in the cache ("cache hit") then the cached copy is used. If the data is not found in the cache ("cache miss") then it is downloaded from the original source. In the case if a cache miss, a copy of the data is temporarily stored in the cache, for later access.

When new data is stored in a cache, often some previously cached data has to be removed in order to free up storage capacity. The strategies that determine what of the old data should be removed are called caching algorithms or caching replacement algorithms.

Any improvements in caching which increases accuracy is of great benefit. This will provide more hits and fewer misses, which improves performance and reduces network congestion.

SUMMARY

An object of the invention is thus to improve caching.

According to a first aspect of the invention, it is presented a method for caching comprising the steps of: determining, in a caching server of a telecommunication network, a user profile to analyse; obtaining, in the caching server, a group of user profiles; obtaining correlation measurements for each user profile in the group of user profiles in relation to the user profile to analyse; and calculating a content caching priority for at least one piece of content of a content history associated with the group of user profiles, taking the correlation measurement into account.

By considering correlation between users, improved accuracy of the caching will be achieved. This will result in fewer cache misses and more cache hits, which improves the performance of the caching using the method. Accordingly, the caching is improved.

The step of obtaining correlation measurements may comprise obtaining correlation measurements from a central correlation measurement provider server in the telecommunications network. Using a central correlation measurement provider server allows for robust data integrity. Optionally, the correlation measurements can be distributed regularly or on demand (i.e. push or pull) from the central correlation measurement provider server down through the network.

The correlation measurements may be calculated when requested by the step of obtaining correlation measurements. By calculating the correlation measurement only when requested, i.e. on demand, the most recent data can be considered, yielding a more accurate correlation measurement. This can be performed centrally or in a node at a lower level of the network hierarchy, that is a node which is closer to the clients.

The correlation measurements may be calculated using static correlation data and/or dynamic correlation data. This provides for great flexibility in using data sources for obtaining the correlation measurement.

The correlation measurements may be calculated using correlation data provided by a third party through an external application programming interface. Third parties can have more data on relationships between users in the system, which thus gives a more accurate correlation measurement and thereby better caching.

The step of obtaining a group of user profiles may comprise obtaining a group of all user profiles currently associated with the caching server. In other words, the relations to all users associated with the caching server are processed in order not to leave any potential relation out between the analysed user and users under the caching server.

The step of obtaining a group of user profiles may comprise obtaining a group of user profiles associated with the user profile to analyse. In other words, it is first determined what users have any sort of relationship with the user to analyse, and only those users are checked for correlation. This allows for improved efficiency.

The method may be started in response to a piece of content being accessed by the user profile to analyse. This allows the cache to become updated based on the most currently accessed data.

The method may be started in response to the user profile to analyse becoming associated with the caching server. For example, this can occur in a mobile network when the user of the user profile moves into an area of responsibility of the caching server.

The step of calculating a content caching priority the content history, may be a subset of a larger content history for the group of user profiles. This allows for more efficient processing as the entire content history can be rather extensive.

The method may further comprise the step of: determining whether to pre-fetch the content coupled to the content caching priority based on the calculated content caching priority. This can create a very efficient caching strategy, particularly when the caching server is located close to the client, such as in a base station or even co-located with the client.

The method may further comprise the step of: determining whether to keep or discard the content coupled to the content caching priority based on the calculated caching priority. This allows for cache management with a small delay due to the efficient update.

In the step of calculating a content caching priority, a content type factor may be utilised, wherein the content type factor varies for different types of content. This allows an operator of the system to configure a relative strength between various types of content. For example, web pages (text and/or images) can be configured to be more important than video content.

In the step of calculating a content caching priority, a weighting factor for the user profile to analyse may be utilised, wherein the weighting factor for the user profile to analyse indicates a levels of service. This allows differentiation in caching for various users, e.g. bronze, silver, or gold subscriptions. Better caching can thus be configured to come at premium.

A second aspect of the invention is a caching server for caching comprising: cache storage; a user profile determiner arranged to determine a user profile to analyse; a group obtainer arranged to obtain a group of user profiles; a correlation measurement obtainer arranged to obtain correlation measurements for each user profile in the group of user profiles in relation to the user profile to analyse; and a content caching priority calculator arranged to calculate a content caching priority for at least one piece of content of a content history of the group of user profiles, taking the correlation measurement into account.

By considering correlation between users, improved accuracy of the caching will be achieved. This will result in fewer cache misses and more cache hits, which improves the performance of the caching server. Accordingly, the caching is improved.

The correlation measurements obtainer may be arranged to obtain correlation measurements from a central correlation measurement provider server in the telecommunications network. Using a central correlation measurement provider server allows for robust data integrity. Optionally, the correlation measurements can be distributed regularly or on demand (i.e. push or pull) from the central correlation measurement provider server down through the network.

The telecommunication network may comprise a mobile communication network and the caching server may be coupled to a base station of the mobile communication network. A base station is a point in the network which is close to the clients and is responsible for communication with the clients, e.g. part of the radio access network in a mobile communication network.

The telecommunication network may comprise a wireless local area network and the caching server may be coupled to a wireless access point device of the wireless local area network.

The caching server may be comprised in a mobile terminal. By co-locating the caching server with the client, in this case a mobile terminal, great efficiency can be achieved, e.g. using pre-fetching.

The content caching priority calculator may calculate the correlation measurements when requested by the correlation measurement obtainer. By calculating the correlation measurement only when requested, i.e. on demand, the most recent data can be considered, yielding a more accurate correlation measurement. This can be performed centrally or in a node at a lower level of the network hierarchy, that is a node which is closer to the clients.

The content caching priority calculator may calculate the correlation measurements using static correlation data and/or dynamic correlation data. This provides for great flexibility in using data sources for obtaining the correlation measurement.

The content caching priority calculator may calculate the correlation measurements using correlation data provided by a third party through an external application programming interface. Third parties can have more data on relationships between users in the system, which thus gives a more accurate correlation measurement and thereby better caching.

The group obtainer may be arranged to obtain a group of all user profiles currently associated with the caching server. In other words, the relation to all users associated with the caching server are processed in order not to leave any potential relation out between the analysed user and users under the caching server.

The group obtainer may be arranged to obtain a group of user profiles associated with the user profile to analyse. In other words, it is first determined what users have any sort of relationship with the user to analyse, and only those users are checked for correlation. This allows for improved efficiency.

The content caching priority calculator may be arranged to calculate the content caching priority in response to a piece of content being accessed by the user profile to analyse. This allows the cache to become updated based on the most currently accessed data.

The content caching priority calculator may be arranged to calculate the content caching priority in response to the user profile to analyse becoming associated with the caching server. For example, this can occur in a mobile network when the user of the user profile moves in to an area of responsibility of the caching server.

The content caching priority calculator may be arranged to calculate the content caching priority based on a content history being a subset of a larger content history for the group of user profiles. This allows for more efficient processing as the entire content history can be rather extensive.

The caching server may further comprise a pre-fetch determiner arranged to determine whether to pre-fetch the content coupled to the content caching priority based on the calculated content caching priority. This can create a very efficient caching strategy, particularly when the caching server is located close to the client, such as in a base station or even co-located with the client.

The caching server may further comprise a content keep determiner arranged to determine whether to keep or discard the content coupled to the content caching priority based on the calculated caching priority. This allows for cache management with a small delay due to the efficient update.

The content caching priority calculator may be arranged to calculate the content caching priority based on a content type factor, wherein the content type factor varies for different types of content. This allows an operator of the system to configure a relative strength between various types of content. For example, web pages (text and/or images) can be configured to be more important than video content.

The content caching priority calculator may be arranged to calculate the content caching priority based on a weighting factor for the user profile to analyse, wherein the weighting factor for the user profile to analyse indicates a levels of service. This allows differentiation in caching for various users, e.g. bronze, silver, or gold subscriptions. Better caching can thus be configured to come at premium.

A third aspect of the invention is a caching system for caching comprising a plurality of caching servers according to the second aspect.

The plurality of caching servers may be arranged in relation to each other in a hierarchy. This allows for caching servers higher up in the hierarchy to serve as a second (or higher) line caching in case there is a miss lower down in the hierarchy. In other words, the risk to have to go to the original content source is reduced.

A fourth aspect of the invention is a computer program for a caching server, the computer program comprising computer program code which, when run on the caching server, causes the caching server to perform the steps of: determining a user profile to analyse; obtaining a group of user profiles; obtaining correlation measurements for each user profile in the group of user profiles in relation to the user profile to analyse; and calculating a content caching priority for at least one piece of content of a content history of the group of user profiles, taking the correlation measurement into account.

The step of obtaining correlation measurements may comprise obtaining correlation measurements from a central correlation measurement provider server in the telecommunications network. Using a central correlation measurement provider server allows for robust data integrity. Optionally, the correlation measurements can be distributed regularly or on demand (i.e. push or pull) from the central correlation measurement provider server down through the network.

The correlation measurements may be calculated when requested by the step of obtaining correlation measurements. By calculating the correlation measurement only when requested, i.e. on demand, the most recent data can be considered, yielding a more accurate correlation measurement. This can be performed centrally or in a node lower in the network.

The correlation measurements may be calculated using static correlation data and/or dynamic correlation data. This provides for great flexibility in using data sources for obtaining the correlation measurement.

The correlation measurements may be calculated using correlation data provided by a third party through an external application programming interface. Third parties can have more data on relationships between users in the system, which thus gives a more accurate correlation measurement and thereby better caching.

The step of obtaining a group of user profiles may comprise obtaining a group of all user profiles currently associated with the caching server. In other words, the relation to all users associated with the caching server are processed in order not to leave any potential relation out between the analysed user and users under the caching server.

The step of obtaining a group of user profiles may comprise obtaining a group of user profiles associated with the user profile to analyse. In other words, it is first determined what users have any sort of relationship with the user to analyse, and only those users are checked for correlation. This allows for improved efficiency.

The computer program may be started in response to a piece of content being accessed by the user profile to analyse. This allows the cache to become updated based on the most currently accessed data.

The computer program may be started in response to the user profile to analyse becoming associated with the caching server. For example, this can occur in a mobile network when the user of the user profile moves in to an area of responsibility of the caching server.

The step of calculating a content caching priority the content history, may be a subset of a larger content history for the group of user profiles. This allows for more efficient processing as the entire content history can be rather extensive.

The computer program may further comprise computer program code to perform the step of: determining whether to pre-fetch the content coupled to the content caching priority based on the calculated content caching priority. This can create a very efficient caching strategy, particularly when the caching server is located close to the client, such as in a base station or even co-located with the client.

The computer program may further comprise computer program code to perform the step of: determining whether to keep or discard the content coupled to the content caching priority based on the calculated caching priority. This allows for cache management with a small delay due to the efficient update.

A fifth aspect of the invention is a computer program product comprising a computer program according to the fourth aspect and a computer readable means on which the computer program is stored.

It is to be noted that any feature of the first, second, third, fourth and fifth aspects may, where appropriate, be applied to any other aspects of these aspects. All aspects can provide the same or similar effects and/or advantages as the first aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF DRAWINGS

The invention is now described, by way of example, with reference to the accompanying drawings, in which:

FIG. 5 is an example of a table of how caching priority can be stored.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
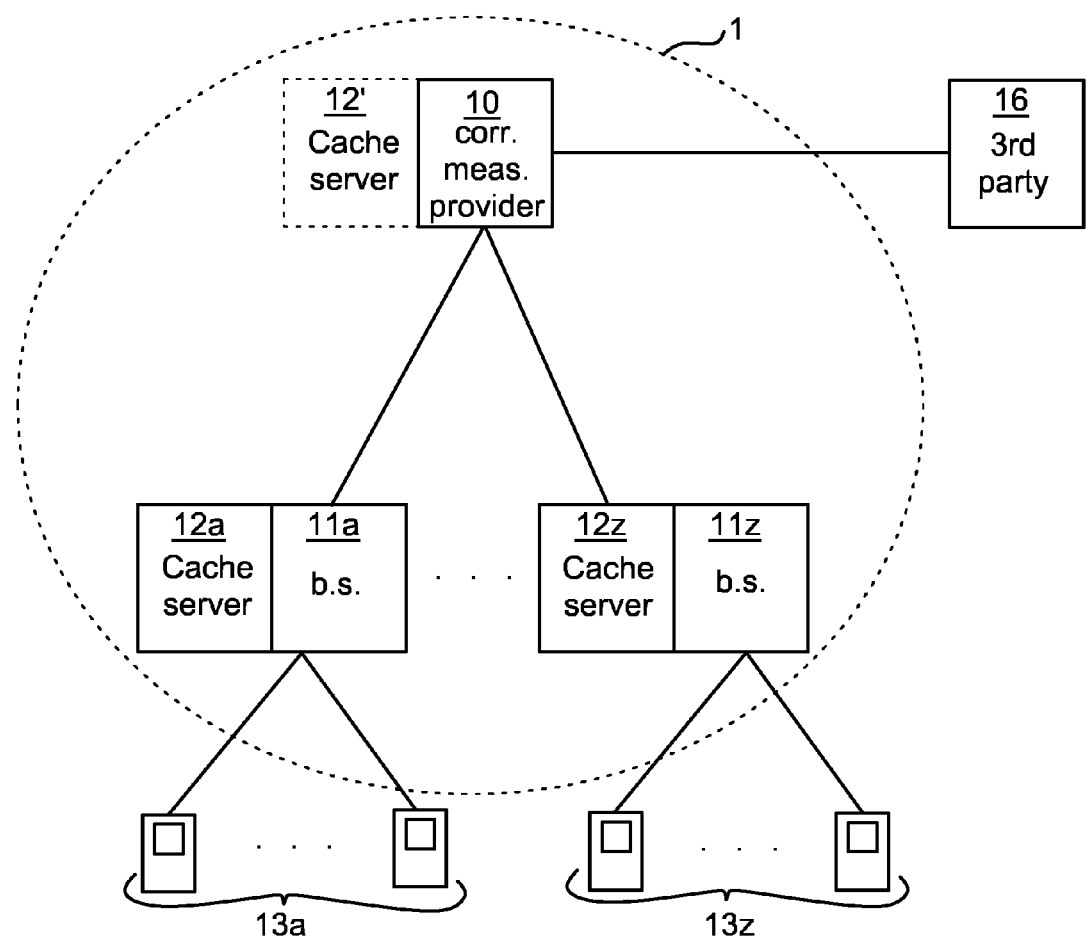
FIGS. 1a-c are a schematic diagrams of environments where embodiments of the present invention can be applied.

FIG. 1a is a schematic diagram of an environment where embodiments of the present invention can be applied.

A caching system comprises a centrally located correlation measurement provider server 10, which is a server which provides correlation measurements which is used by caching servers 12a-z, 12'. The caching servers 12a-z, 12' are located in different locations within the caching system 1. For instance, in the embodiment shown in FIG. 1a, caching servers 12a-z are each connected to a respective network node 11a-z of a caching system 1. The network nodes 11a-z can for example be base transceiver stations, node B (in compliance with UMTS, Universal Mobile Telecommunications System), enhanced node B (in compliance with LTE, Long Term Evolution). Alternatively, the network nodes 11a-z can be wireless access points, e.g. in compliance with any of the IEEE 802.11 standards.

Each network node 11a-z has a set 13a-z of one or more associated clients. In this way, each of the caching servers 12a-z is responsible for the caching of a set of clients 13a-z. The clients 13a-z can be any suitable client capable of receiving digital content, e.g. a mobile terminal such as a mobile phone, personal digital assistant (PDA), netbook, or laptop computer. Alternatively or additionally, the client could even be in the form of a stationary desktop computer. The users of the clients 13a-z have an associated user profile, as identified using a user identifier. The user profile can for example be connected to a subscription, such as a mobile phone subscription. The user identifier can be a phone number, an e-mail address or any other suitable user identifier which is unique within the caching system. Whenever the term user is mentioned herein, it is to be interpreted as a user identifiable by a user identifier.

One or more third parties 16 can be connected to the correlation measurement provider server 10. This allows, for example, the third party 16 to provide data to the correlation measurement provider server 10 about usage history of a user, or connections between various users under the responsibility of the caching system 1.

For example, the third party 16 can be a server of a social networking website, such as FaceBook, MySpace or Twitter, or an instant messaging service such as Windows Live Messenger, ICQ or Google talk. Such websites can provide not only information regarding two users being connected, but can also provide a measurement of the extent to which they are connected, e.g. using communication history between two users. Alternatively or additionally, the third party 16 can be a server with access to some for of content history of the user, such as Google, or any content provider. For example, a video content website can have information that 80 percent of users that request content A also requests content B. This can for example indicate two pieces of content that are content parts that have been split up. In other words, in a situation where content A is requested, it would be beneficial to prefetch content B. Furthermore, online shopping platforms such as Amazon, Ebay, etc. can register preferences for different types of content for each user, along with relationships between users. DPI (deep packet inspection) capabilities would allow inferring some of this information from unencrypted traffic within the network.

Optionally, the caching servers can be arranged in a hierarchy. For example, a central caching server 12' can be provided with more storage and thereby save more content than each of the caching servers 12a-z that are arranged in a lower point in the hierarchy. This allows the central caching server 12' to serve as a second caching server if there is a miss in the local caching server 12a-z. Optionally, there can be more caching servers provided at one or more intermediate levels. Optionally, the clients 13a-z can also house a caching server.

Figure 1B:
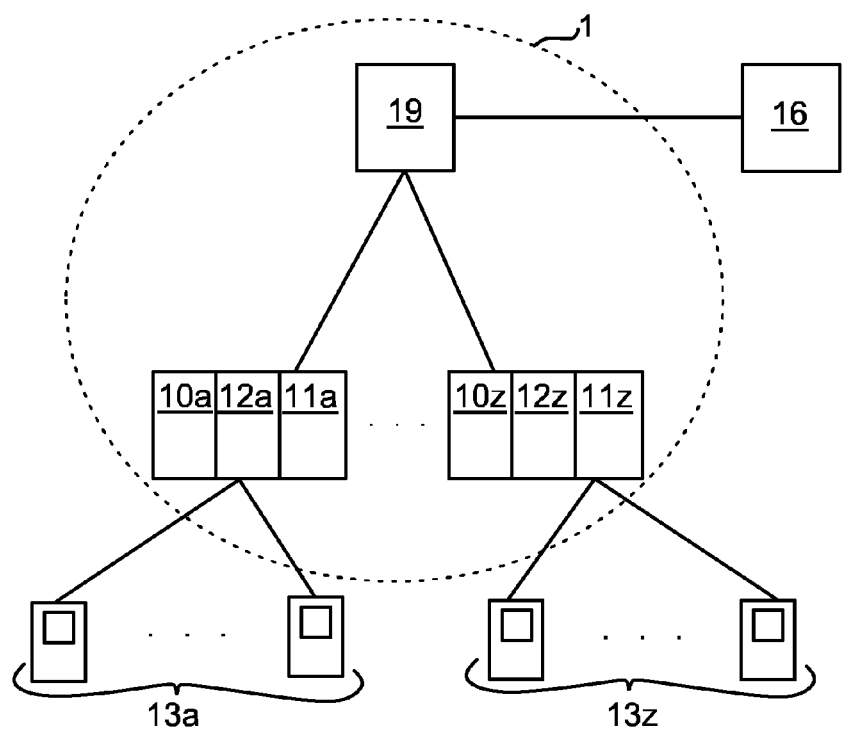

FIG. 1b is a schematic diagram of an environment similar to the environment of FIG. 1a, but where additional correlation measurement provider servers 10a-z are co-located with each of the network nodes 11a-z and caching servers 12a-z, respectively. Here, functionality can be provided that synchronises the correlation measurement provider servers 10, 10a-z throughout the network.

Figure 1C:
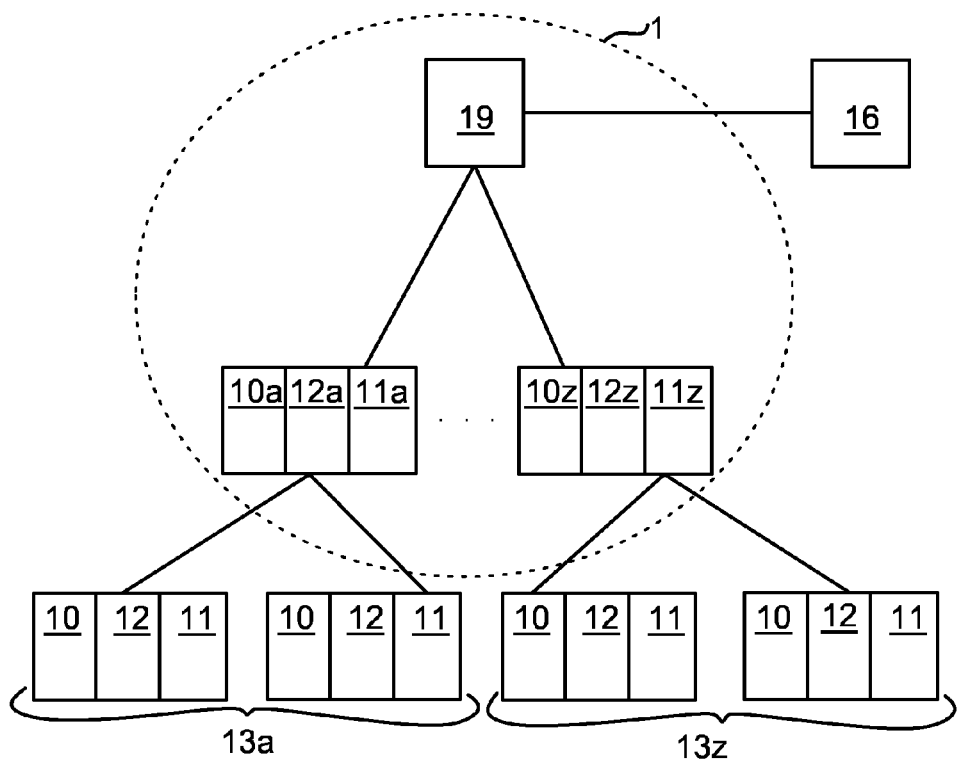

FIG. 1c is a schematic diagram of an environment similar to the environment of FIG. 1b, but where correlation measurement provider servers 10' are co-located with the clients 13a-z and caching servers 12a-z. Again, synchronisation can occur between the correlation measurement provider servers 10a-z, 10, 10'.

Figure 2:
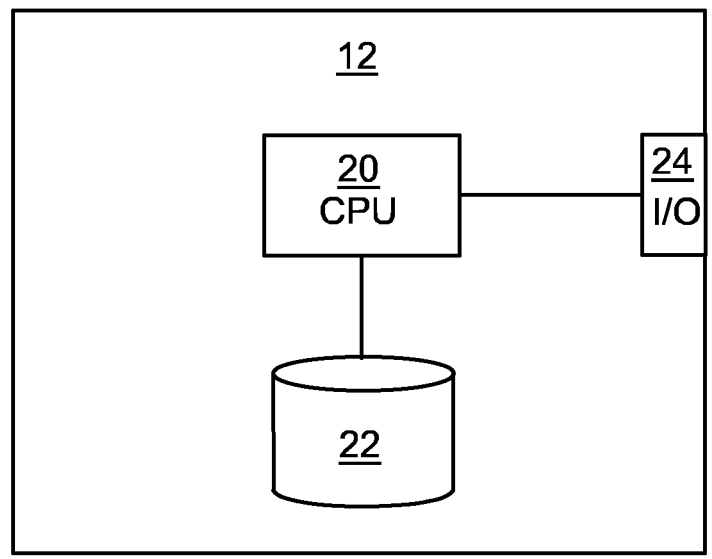
FIG. 2 is a schematic diagram of components of any of the caching servers of FIGS. 1a-c.

FIG. 2 is a schematic diagram of components of the caching servers 12a-z, 12' of FIGS. 1a-z. All of the caching servers can conform to the description provided below, whereby they are collectively referred to by the reference numeral 12, even if the configuration can vary between the caching servers 12a-z, 12'.

A controller 20 is provided using any suitable central processing unit (CPU), microcontroller, digital signal processor (DSP), etc., capable of executing software instructions stored in a computer program product 22, e.g. in the form of a memory. The computer program product 22 can be any combination of read and write memory (RAM) and read only memory (ROM). The memory 22 also comprises persistent storage, which, for example, can be any single one or combination of magnetic memory, optical memory, or solid state memory. The computer program product 22 can be co-located with memory for storing cached content and tables describing the cached content, including a content caching priority for each stored content. The content caching priority is a relative measurement indicating how important it is to keep a piece of content. For example, higher content caching priority can mean that there is a higher probability of the content being accessed. In one example, the content caching priority is a calculated probability of the content being accessed. In other words, the content caching priority allows for a comparison between various pieces of content to determine which content is more likely to be accessed again.

An input/output interface 24 is provided to allow the caching server to interact with other components, such as the correlation measurement provider server 10 or clients 13a-z. The input/output interface 24 can for example be a network interface such as an Ethernet interface. In the case that the caching server is co-located with another device, such as a network node or mobile terminal, some or all of the controller 20, the computer program product 22 and input/output interface 24 can be shared with the other device or devices.

Optionally, a user interface is provided (not shown) for operator usage. Additionally or alternatively, the caching server 12 can be operated remotely or locally using the input/output interface 24.

The caching server 12 can be integrated in one unit, or it can be separated into several separate units, e.g. for reasons of upgradeability, ease of implementation or redundancy. In the case that there are several units that make up the caching server 12, some components may be present in more than one unit, such as the controller 20 and/or the storage 22.

Furthermore, the caching server 12 can be co-located with the client 13a-z, using hardware of the client but using software modules as necessary to implement the caching.

Figure 3:
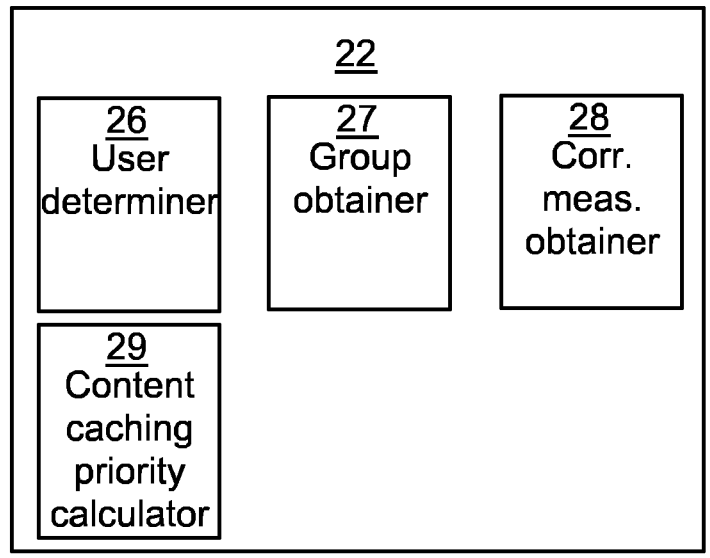
FIG. 3 is a schematic diagram of modules of the computer program product of FIG. 2.

FIG. 3 is a schematic diagram of modules of the computer program product 22 of FIG. 2.

A user determiner 26 is arranged to determine a user profile to analyse. The user profile is coupled to a client under the control of the caching server. For example, the user profile can be connected to a subscription of a mobile terminal, where the mobile terminal is the client and the subscription can be kept on a Universal Integrated Circuit Card (UICC) inserted in the mobile terminal.

A group obtainer 27 is arranged to obtain a group of user profiles, such as user identifiers under the responsibility of the caching server or user identifiers of users with connections to a particular user.

A correlation measurement obtainer 28 is arranged to obtain correlation measurements for each user profile in the group in relation to the user profile to analyse.

A content caching priority calculator 29 is arranged to calculate a content caching priority for at least one piece of content of a content history of the group of user profiles, taking the correlation measurement into account.

Figure 4:
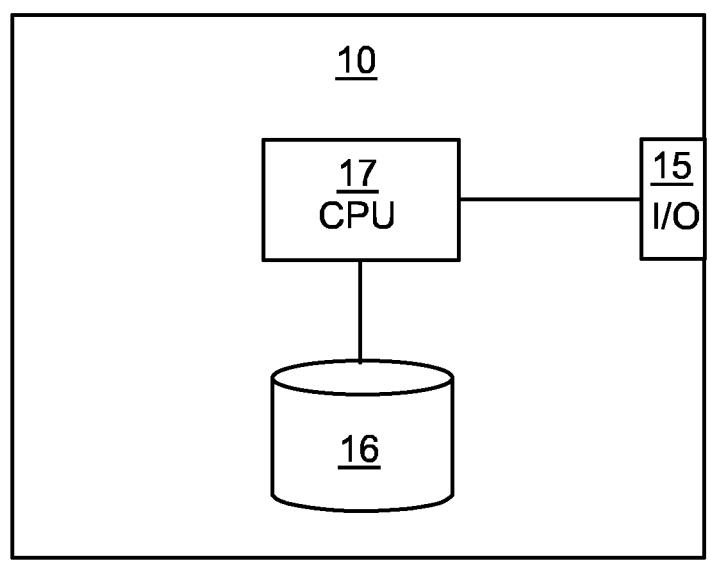
FIG. 4 is a schematic diagram of components of the correlation measurement provider server of FIG. 1.

FIG. 4 is a schematic diagram of components of the correlation measurement provider server 10 of FIG. 1. A controller 17 is provided using any suitable central processing unit (CPU), microcontroller, digital signal processor (DSP), etc., capable of executing software instructions stored in a computer program product 16, e.g. in the form of a memory. The computer program product 16 can be any combination of read and write memory (RAM) and read only memory (ROM). The computer program product 16 also comprises persistent storage, which, for example, can be any single one or combination of magnetic memory, optical memory, or solid state memory.

An input/output interface 15 is provided to allow the correlation measurement provider server 10 to interact with other components, such as the caching servers 12a-z, 12'. The input/output interface 24 can for example be a network interface such as an Ethernet interface. In the case that the correlation measurement provider server 10 is co-located with another device, such as a caching server, network node or mobile terminal, some or all of the controller 17, the computer program product 16 and input/output interface 15 can be shared with the other device or devices.

Optionally, a user interface is provided (not shown) for operator usage. Alternatively, the correlation measurement provider server 10 can be operated remotely or locally using the input/output interface 15.

The correlation measurement provider server 10 can be integrated in one unit, or it can be separated into several separate units, e.g. for reasons of upgradeability, ease of implementation or redundancy. In the case that there are several units that make up the correlation measurement provider server 10, some components may be present in more than one unit, such as the controller 17 and/or the computer program product 16.

The correlation measurement provider server 10 builds and stores information referring to social relationship between users. Such information can e.g. be derived directly by a telecommunications provider from frequency of communication between users (e.g. using phone calls, messaging, or other communication), or similarity of previously accessed content, etc. As mentioned above, contributions of the social relationships can be submitted by other third parties 16. Furthermore, a relationship between two users can be derived from being in the same location or have similar location history.

The correlation measurement provider server 10 has an interface, implemented via input/output interface 15, that can allow network functions, e.g. SMS (short messaging service) server, mobility management function, location aware services function, caches, etc, to update the correlation measurement provider server 10 on relationships between users.

In addition, the correlation measurement provider server 10 stores a history of what data was previously accessed by a user. Based on this information, the correlation measurement provider server 10 can predict the likelihood that a piece of data will be requested by a user in a more sophisticated way than what is known in the prior art, and supports caching and pre-fetching algorithms in network nodes and/or in mobile terminals.

FIG. 5 is an example of a table 34 of how the caching priority can be stored. In this example, there are three columns, one column for content id 30, one column for content size 31 and one column for content caching priority 30. The content id 30 is at least part of the key for the table 34. Entry in the table 34 corresponds to a particular piece of content, such as a text, an image, a video, a sound file, etc. Each entry thus has a size (e.g. in bytes, kilobytes or megabytes) and a content caching priority. The content caching priority can be any scalar number, such as a floating point number in a range from 0.0 to 1.0 or an integer between 0 and 255. In this example, a higher number indicates a higher priority, but the table is equally usable if a lower number indicates a higher priority. Furthermore, size is in this example measured in kilobytes.

Such a table 34 can be stored in memory co-located with the computer program product 22 (FIG. 2) of each of the caching servers 12a-z, 12'. The table 34 allows the caching server to know what entry to discard when needed. For example, when a new piece of content is accessed and the caching server needs to discard content in the cache to make room for the new content, the caching server can discard the lowest priority item, which in this example is the entry for content id z. This is sufficient if the size of the new content is less than or equal to 10 kilobytes. If more content needs to be discarded, the caching server 12a-z, 12' can simply progress up the content caching priority order and discard content until sufficient amount of space has been made available.

Figure 6:
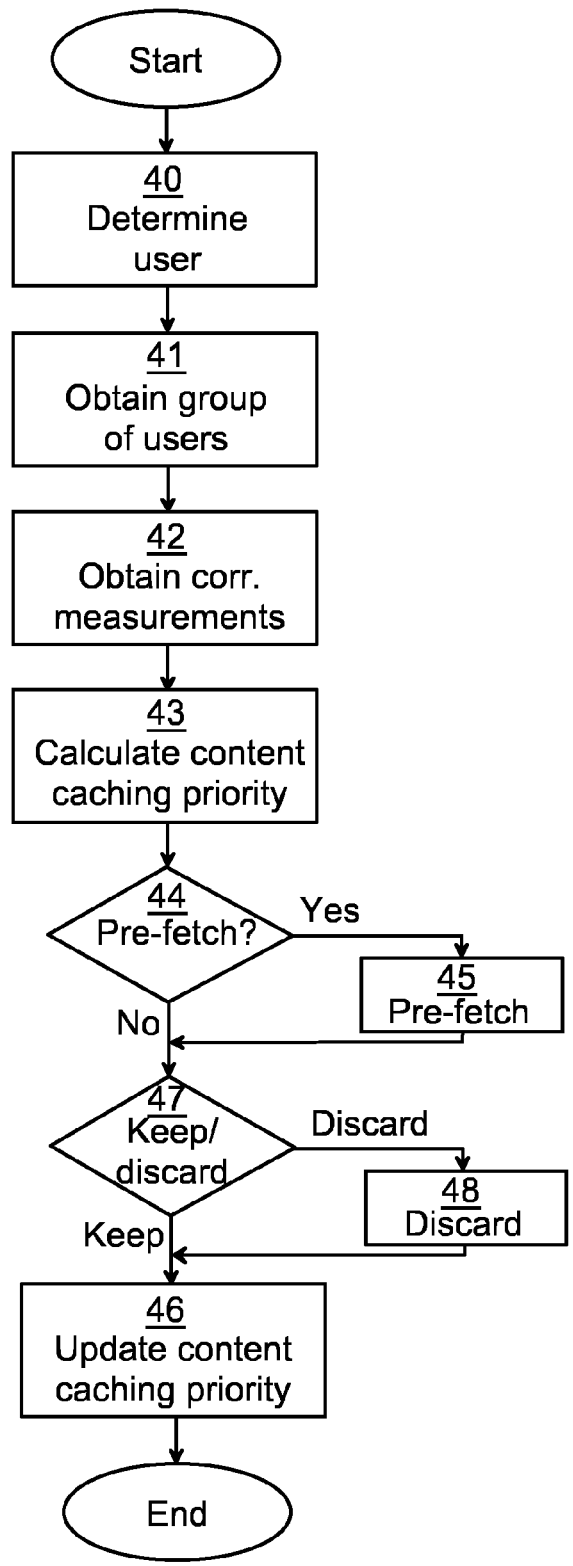
FIG. 6 is a flow chart showing a method according to one embodiment.

FIG. 6 is a flow chart showing a method according to one embodiment executed in a caching server of FIGS. 1a-c. The method can be started in response to a piece of content being accessed by the user profile to analyse. Alternatively, the method can be started in response to the user profile to analyse becoming associated with a caching server, i.e. a client becoming part of clients under the responsibility of a caching server.

In an initial determine user step 40, a user profile to analyse is determined. This can for example be a user profile of a new client of the caching server.

In an obtain group of users step 41, a group of user profiles is determined. This can for example be user profiles with a relationship measure stronger than a particular threshold, in relation to the user to analyse. In one embodiment, that threshold is zero, whereby all users that have any type of correlation measurement in relation to the user profile to analyse are made part of the group. Alternatively, all user profiles currently associated with the caching server are made part of the group.

In an obtain correlation measurements step 42, correlation measurements between the user profile to analyse and each user profile in the group of user profiles is obtained (see description in relation to FIG. 7 below for details).

In a calculate content caching priority step 43, the priority of a particular piece of content is calculated. This step can occur in advance, or it can occur or on demand. By calculating the correlation measurement only when requested, i.e. on demand, the most recent data can be considered, yielding a more accurate correlation measurement. This calculation can occur centrally or in a node lower in the network.

The actual calculation can occur using any one of a number of suitable algorithms. For example, any algorithm similar to page ranking (as used by search engines such as Google) counting the number of links or references to a particular piece of content can be used. Optionally, an external interface can be provided on the caching server and/or the correlation measurement provider server to allow operators to specify a particular algorithm on how to rank the content.

As a first example, a formula such as the following could be used:

$$p_k = \frac{\left(\sum_{i=1}^{N} \text{num\_accesses}_j * \text{corr\_meas}_{ij}\right) * \text{user\_profile\_weight}_j + \sum_{q=1}^{M} \text{num\_accesses} * \text{user\_profile\_weight}_q}{\text{time\_in\_cache}}$$

where:
$P_k$=priority of the k-th content item in the cache
num_accesses$_j$=number of accesses to the content made by user j corr_meas$_{ij}$=correlation measurement value characterising the strength of the social relationship between user i and user j user_profile_weight$_i$=weighting factor that allows to distinguish between various levels of service, for example bronze, silver, gold, of user subscriptions time_in_cache=time interval since the piece of content was added to the cache As a second example, a formula such as the following could be used:

$$p_k = \exp\left(-\cfrac{1}{\sum_{i=1}^{N}\left(\sum_{j=1}^{M}\cfrac{\text{access\_time}_j}{\text{current\_time}} * \text{corr\_meas}_{ij}\right) * \text{content\_type\_factor} * \text{user\_profile\_weight}_i}\right)$$

where:

P$_k$=priority of the k-th content item in the cache access_time$_j$=time when the content was accessed by user j corr_meas$_{ij}$=correlation measurement value characterising the strength of the social relationship between user i and user j user_profile_weight$_i$=weighting factor that allows to distinguish between various levels of service, for example bronze, silver, gold, of user subscriptions content_type_factor=weighting factor that allows the operator to differentiate the policy for caching different types of content, for example prioritise music over images and web pages In an optional conditional pre-fetch step 44, it is determined whether the method should perform pre-fetching. This can be determined using the calculated content caching priority from the previous step. If pre-fetch is to be performed, the method continues to a pre-fetch step 45. Otherwise, the method continues to an update content caching priority step 46 or, if present, an optional keep/discard step 47.

In the pre-fetch step 45, the content in question is pre-fetched to the caching server.

In the optional conditional keep/discard step 47, it is determined whether to keep or discard the piece of content. This step is optional, since this determination can occur at another stage in the caching server. If it determined that the piece of content should be kept, the piece of content is saved and the method continues to the update content caching priority step 46. Otherwise, if the piece of content is determined to be discarded, the method continues to a discard step 48.

In the discard step, the piece of content is discarded.

In the update content caching priority step 46, a table for content caching priority (see FIG. 5) is updated with the calculated content caching priority.

Figure 7:
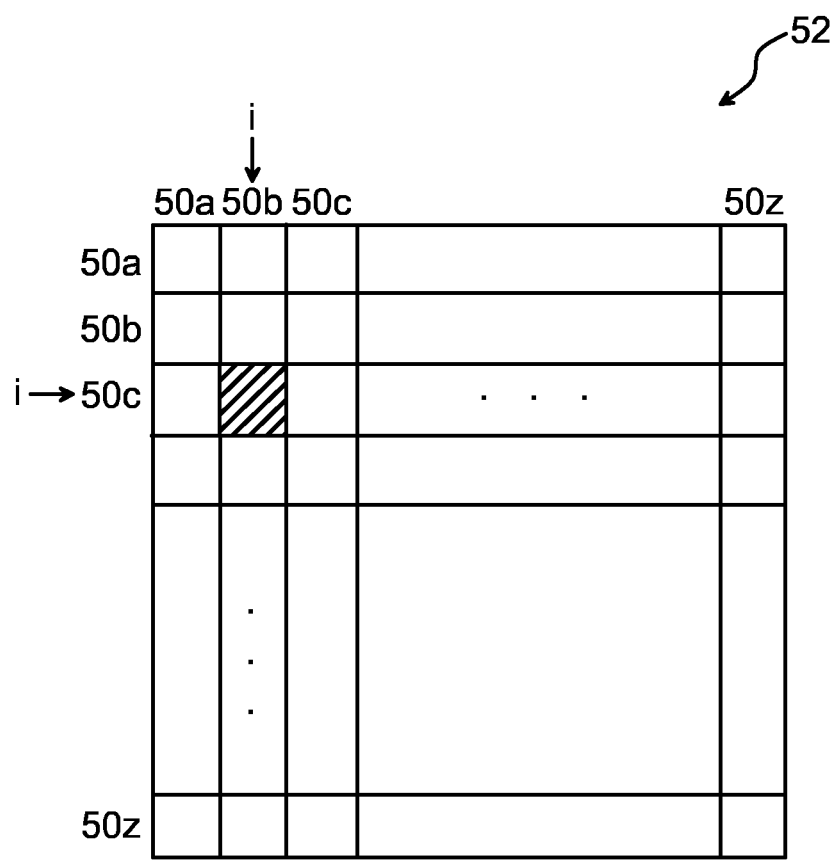
FIG. 7 is a schematic diagram illustrating correlation between different users of FIG. 1.

FIG. 7 is a schematic diagram illustrating correlation between different users of the clients of FIG. 1.

The correlation measurement provider server 10 can represent social relationship reflected by accessing online content, in a social networking data base comprising a matrix 52 where each field of the matrix n$_{ij}$ refers to the relationship between users i and j, selected from users 50a-z. The value n$_{ij}$ is 0 if there is no information on social relationship between users i and j, while higher values of n$_{ij}$ indicate a stronger relationship and thereby a higher probability of accessing similar content. The stronger relationship may be directly determined by stronger social relationships in real life, but it is not limited to this.

Optionally, there are several matrices, where each of them denotes the strength of the user relationships for a different type of content. This would, for example, indicate whether a particular user is more likely to point the content browser of their clients to a story that a friend has read compared to seeing a video clip the same friend watched.

In addition, the correlation measurement provider server 10 could store information about multiple devices with subscriptions associated with one particular user (for example, mobile phone, laptop with/without 3G module), along with type of content supported by a particular device. This would enable to maintain preferences related to the type of content a particular user is accessing from a particular type of device, potentially allowing for further optimisation of the caching process.

The social networking database can contain static as well as dynamic information. For example, the matrix described above, referring to static information, could be complemented by short-lived information describing similarities between users, such as user location or content accessed recently.

One possible algorithm to manage the correlation measurement between two users (n$_{ij}$ in the description above) is to increase this number when there is an indication of social relationship between the two users, and decrease the number with time. The increase can vary depending on the nature of the indication of relationship.

Another option is to increase the number corresponding to the relationship between the users (n$_{ij}$) based on the rate of cache hits generated by the algorithm based on content accessed by one of the users.

The user history data base is part of the correlation measurement provider server 10. The user history data base stores a record of what data was accessed by each user based on information e.g. received from an external interface.

From an implementation point of view, the user history data base can be co-located or integrated with the caching servers 12. Since the caching servers 12 store the previously accessed data, the additional requirement is to store a list of users who have accessed the given piece of data. As the data storage in the caching servers 12 is temporary, the privacy of the user is not at risk. For longer periods, the user history data base stores for longer intervals only aggregate information related to general characteristics of the data that was accessed by a particular user.

As an extension, the user history data base can store the circumstances when a piece of data was downloaded. Examples are the downloading user's location, type of terminal, time of day, content accessed previously, etc.

While the embodiments herein are disclosed in conjunction with telecommunication and data networks, the present invention can be embodied in any digital communication network where caching is beneficial.

The invention has mainly been described above with reference to a few embodiments. However, as is readily appreciated by a person skilled in the art, other embodiments than the ones disclosed above are equally possible within the scope of the invention.

The invention claimed is:

1. A method for caching comprising the steps of:
    determining, in a caching server of a telecommunication network, a user profile to analyse;
    obtaining, in the caching server, a group of user profiles;
    obtaining correlation measurements for each user profile in the group of user profiles in relation to the user profile to analyse; and calculating a content caching priority for two or more pieces of content of a content history associated with the group of user profiles, taking the correlation measurements into account.

2. The method according to claim 1, wherein the step of obtaining the correlation measurements comprises obtaining the correlation measurements from a central correlation measurement provider server in the telecommunication network.

3. The method according to claim 1, wherein the correlation measurements are calculated when requested by the step of obtaining the correlation measurements.

4. The method according to claim 3, wherein the correlation measurements are calculated using static correlation data and/or dynamic correlation data.

5. The method according to claim 3, wherein the correlation measurements are calculated using correlation data provided by a third party through an external application programming interface.

6. The method according to claim 1, wherein the step of obtaining the group of user profiles comprises obtaining a group of all user profiles currently associated with the caching server.

7. The method according to claim 1, wherein the step of obtaining the group of user profiles comprises obtaining a group of user profiles associated with the user profile to analyse.

8. The method according to claim 1, wherein the method is started in response to a piece of content being accessed by the user profile to analyse.

9. The method according to claim 1, wherein the method is started in response to the user profile to analyse becoming associated with the caching server.

10. The method according to claim 1, wherein in the step of calculating the content caching priority, the content history is a subset of a larger content history for the group of user profiles.

11. The method according to claim 1, further comprising the step of:
determining whether to pre-fetch the content coupled to the content caching priority based on the calculated content caching priority.

12. The method according to claim 1, further comprising the step of:
determining whether to keep or discard the content coupled to the content caching priority based on the calculated content caching priority.

13. The method according to claim 1, wherein in the step of calculating the content caching priority, a content type factor is utilised, wherein the content type factor varies for different types of content.

14. The method according to claim 1, wherein in the step of calculating the content caching priority, a weighting factor for the user profile to analyse is utilised, wherein the weighting factor for the user profile to analyse indicates a level of service.

15. A caching server of a telecommunication network for caching comprising:
cache storage;
a user profile determiner arranged to determine a user profile to analyse;
a group obtainer arranged to obtain a group of user profiles;
a correlation measurement obtainer arranged to obtain correlation measurements for each user profile in the group of user profiles in relation to the user profile to analyse; and
a content caching priority calculator arranged to calculate a content caching priority for two or more pieces of content of a content history of the group of user profiles, taking the correlation measurements into account.

16. The caching server according to claim 15, wherein the correlation measurement obtainer is arranged to obtain the correlation measurements from a central correlation measurement provider server in the telecommunication network.

17. The caching server according to claim 15, wherein the telecommunication network comprises a wireless local area network and the caching server is coupled to a wireless access point device of the wireless local area network.

18. The caching server according to claim 15, wherein the caching server is comprised in a mobile terminal.

19. A computer program for caching by a caching server of a telecommunication network, the computer program comprising computer program code which, when run on the caching server, causes the caching server to perform the steps of:
determining a user profile to analyse;
obtaining a group of user profiles;
obtaining correlation measurements for each user profile in the group of user profiles in relation to the user profile to analyse; and
calculating a content caching priority for two or more pieces of content of a content history of the group of user profiles, taking the correlation measurements into account.

* * * * *

UNITED STATES PATENT AND TRADEMARK OFFICE
CERTIFICATE OF CORRECTION

PATENT NO.        : 8,560,777 B2                                                   Page 1 of 1
APPLICATION NO.   : 13/515194
DATED             : October 15, 2013
INVENTOR(S)       : Meirosu et al.

It is certified that error appears in the above-identified patent and that said Letters Patent is hereby corrected as shown below:

In the Specification

In Column 7, Line 21, delete "some for of" and insert -- some of --, therefor.

In Column 9, Line 54, delete "content caching priority 30." and insert -- content caching priority 32. --, therefor.

Signed and Sealed this
Twenty-ninth Day of April, 2014

Michelle K. Lee
*Deputy Director of the United States Patent and Trademark Office*